US012561769B2

(12) United States Patent
Zhang et al.

(10) Patent No.: US 12,561,769 B2
(45) Date of Patent: Feb. 24, 2026

(54) IMAGE DISTORTION CORRECTION SYSTEM AND METHOD

(71) Applicant: Nanjing SemiDrive Technology LTD., Nanjing (CN)

(72) Inventors: Lihang Zhang, Nanjing (CN); Qiang Zhang, Nanjing (CN); Yujing Qiu, Nanjing (CN)

(73) Assignee: Nanjing SemiDrive Technology LTD., Nanjing (CN)

( * ) Notice: Subject to any disclaimer, the term of this patent is extended or adjusted under 35 U.S.C. 154(b) by 923 days.

(21) Appl. No.: 17/749,413

(22) Filed: May 20, 2022

(65) Prior Publication Data

US 2022/0375046 A1    Nov. 24, 2022

(30) Foreign Application Priority Data

May 20, 2021    (CN) .......................... 202110551077.8

(51) Int. Cl.
G06T 5/80        (2024.01)
G09G 5/12        (2006.01)

(52) U.S. Cl.
CPC ................. G06T 5/80 (2024.01); G09G 5/12 (2013.01); *G06T 2207/20132* (2013.01)

(58) Field of Classification Search
CPC ............. G06T 5/80; G06T 2207/20132; G06T 2207/10016; G06T 2207/10004; G09G 5/12
See application file for complete search history.

(56) References Cited

U.S. PATENT DOCUMENTS

| | | | | |
|---|---|---|---|---|
| 6,819,333 | B1 * | 11/2004 | Sadowski | ................. G06T 3/18 |
| | | | | 345/611 |
| 2017/0225621 | A1 * | 8/2017 | Shiohara | ................ H04N 23/69 |
| 2018/0324391 | A1 * | 11/2018 | Ozawa | ................... G09G 5/005 |
| 2018/0336667 | A1 | 11/2018 | Clark, II et al. | |
| 2021/0014388 | A1 | 1/2021 | Sun | |

FOREIGN PATENT DOCUMENTS

| | | |
|---|---|---|
| CN | 111861883 A | 10/2020 |
| CN | 212267346 U | 1/2021 |

OTHER PUBLICATIONS

The European Patent Office (EPO) The Extended European Search Report for 22174211.7, Oct. 28, 2022 7 Pages.

* cited by examiner

*Primary Examiner* — Phuoc Tran
(74) *Attorney, Agent, or Firm* — ANOVA LAW GROUP, PLLC

(57) ABSTRACT

An image distortion correction system includes an image data acquirer configured to receive image data from a camera, crop an image of the image data according to cropping control information generated by an image corrector, and stores the image data of the cropped image into a memory; the image corrector configured to retrieve the image data of the cropped image from the memory, correct the cropped image, and send the image data of the corrected image to a display driver for display; a display follower configured to generate a display line-field synchronization signal and send the display line-field synchronization signal to the display driver; the display driver; and the memory.

14 Claims, 4 Drawing Sheets

IMAGE DISTORTION CORRECTION SYSTEM AND METHOD

CROSS-REFERENCE TO RELATED APPLICATION

This application claims priority to Chinese Patent Application No. 202110551077.8, filed on May 20, 2021, the entire content of which is incorporated herein by reference.

TECHNICAL FIELD

The present disclosure relates to the technical field of image processing and, more particularly, to a system and a method for correcting image distortion in a streaming media rearview mirror system.

BACKGROUND

As the architecture of auto-electronics advances, the technology of the streaming media rearview mirror is rapidly gaining popularity. Meanwhile, the requirements for safety, reliability and low latency of a streaming media rearview mirror system have also become more and more demanding.

To widen a viewing angle of the streaming media rearview mirror system, a wide-angle camera or even a fisheye camera is often used for image acquisition, but acquired image data is often distorted. At the same time, due to the difference between the viewing angles of the camera and the driver, the viewing angle of the acquired images needs to be adjusted. The streaming media rearview mirror system acquires image information through the camera, and presents the acquired images to a driver through a display after image distortion correction, such that a traditional optical rearview mirror system can be replaced.

In streaming media rearview mirror systems, the image acquired by the camera needs to be corrected and transformed and then sent to a display controller for display. One or more frames of image data need to be cached before performing an image correction operation due to a requirement of image input and output synchronization of the camera, such that a latency from the image input to the image output/display in the streaming media rearview mirror system is substantially increased. The increased latency in turn reduces the reaction time reserved for the driver. Because of the need for caching multi-frame image data, a larger memory is also needed in the streaming media rearview mirror system, thereby raising the cost thereof.

SUMMARY

To solve the above technical problem, the technical solutions are described below in the embodiments of the present disclosure.

One aspect of the present disclosure provides an image distortion correction system. The system includes: an image data acquirer configured to receive image data from a camera, crop an image of the image data according to cropping control information generated by an image corrector, and stores the image data of the cropped image into a memory; the image corrector configured to retrieve the image data of the cropped image from the memory, correct the cropped image, and send the image data of the corrected image to a display driver for display; a display follower configured to generate a display line-field synchronization signal and send the display line-field synchronization signal to the display driver; the display driver; and the memory.

Another aspect of the present disclosure provides an image distortion correction method. The method includes: obtaining an image, cropping the image according to cropping control information, and storing the cropped image; generating a line count signal and an input line-field synchronization signal; generating an initial offset, and correcting the cropped image; and generating a display line-field synchronization signal according to the input line-field synchronization signal, the initial offset, and a configured frame rate ratio of field synchronization, and displaying the corrected image according to the display line-field synchronization signal.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts and may be encompassed in the present disclosure.

DETAILED DESCRIPTION OF THE EMBODIMENTS

In the following description, for the purpose of illustration rather than limitation, specific details such as a specific system structure and technology are proposed for a thorough understanding of the embodiments of the present disclosure. However, it should be understood to those skilled in the art that the present disclosure can also be implemented in other embodiments without these specific details. Under certain circumstances, detailed descriptions of well-known systems, devices, circuits, and methods are omitted to avoid unnecessary details from obscuring the description of the present disclosure.

Embodiment 1

Figure 1:
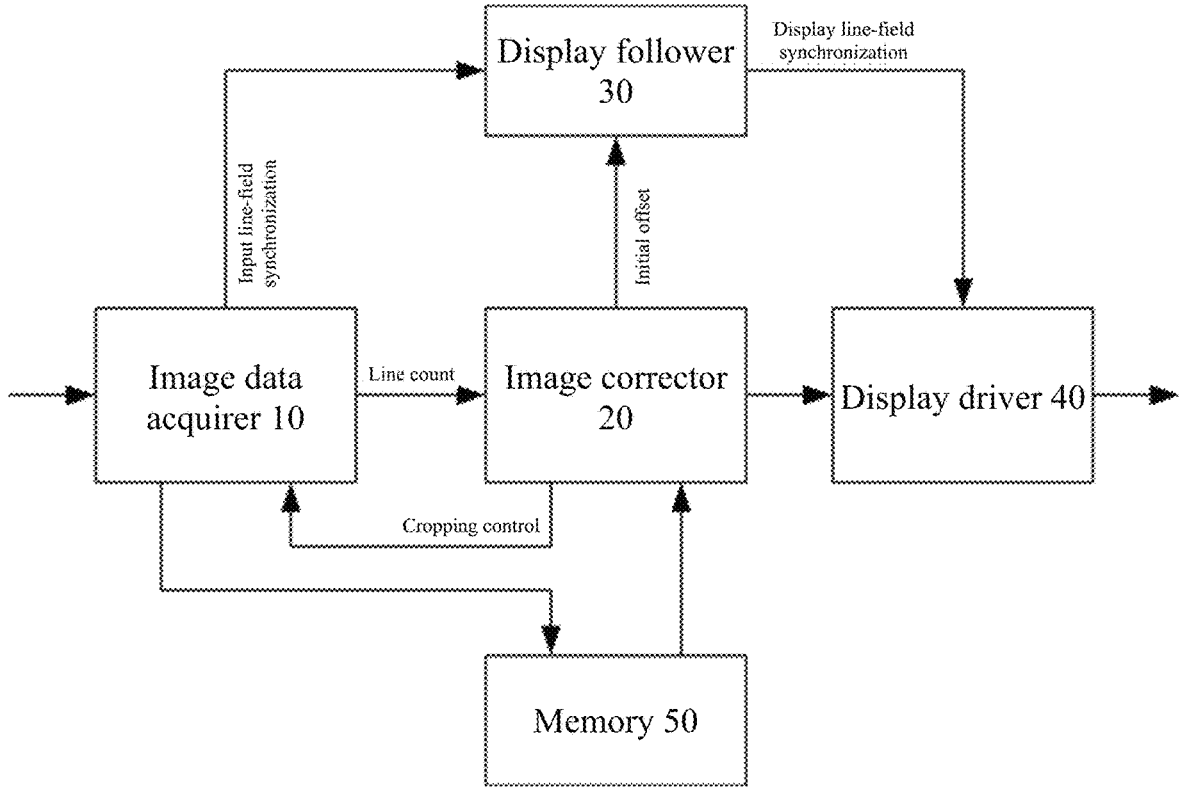
FIG. 1 is a schematic structural diagram of an exemplary image distortion correction system according to some embodiments of the present disclosure.

FIG. 1 is a schematic structural diagram of an exemplary image distortion correction system according to some embodiments of the present disclosure. As shown in FIG. 1, the image distortion correction system includes an image data acquirer 10, an image corrector 20, a display follower 30, a display driver 40, and a memory 50.

The image data acquirer 10 is configured to receive image data from a camera. An image of the image data received by the image data acquirer 10 is cropped according to cropping control information inputted by the image corrector 20. The cropped image is packaged and stored in the memory 50. An input line-field synchronization signal is generated and sent to the display follower 30. A line count signal is generated and sent to the image corrector 20.

Figure 3:
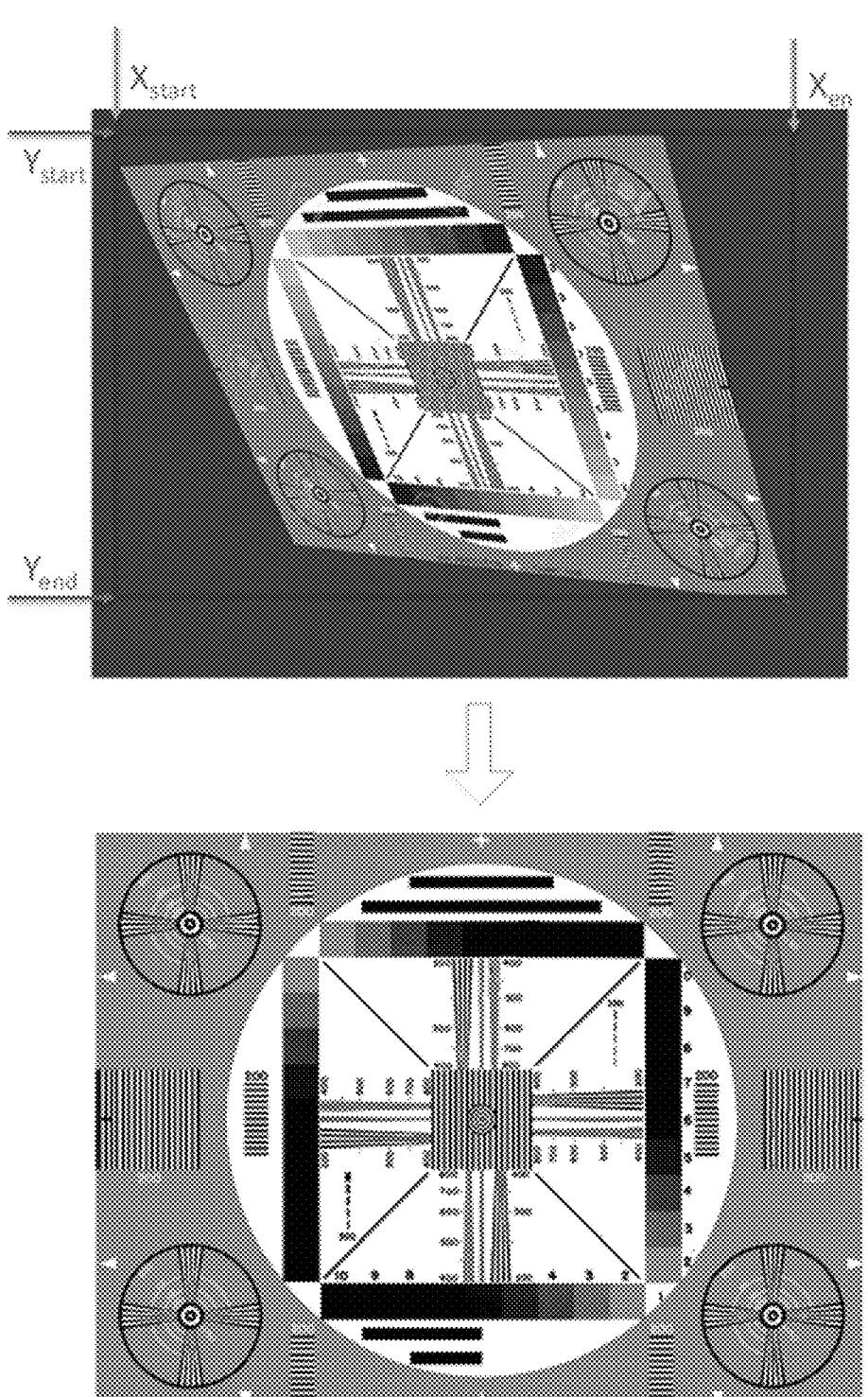
FIG. 3 is a schematic diagram of cropping an input image according to some embodiments of the present disclosure.

FIG. 3 is a schematic diagram of cropping an input image according to some embodiments of the present disclosure. As shown in FIG. 3, the image acquired by the camera is deformed with respect to a viewing angle of the displayed image. The image data acquirer 10 crops the input image according to boundary control information outputted by the image corrector 20, such that only part of the input image within a boundary of the boundary control information is written into a system memory (e.g., the memory 50), thereby reducing the use of the system memory.

The image corrector 20 reads the image data including the cropped image from the memory 50, corrects the cropped image, and sends the image data of the corrected image to the display driver 40.

In some embodiments, the image corrector 20 starts or suspends the correction of the cropped image according to the line count signal from the image data acquirer 10. When a line number of the retrieved image data exceeds a count value of the line count signal, the correction is suspended. Otherwise, the correction is started.

In some embodiments, the image corrector 20 calculates an effective input image area information required for display according to the requirement of the image correction, and generates the cropping control information including a horizontal start point (Xstart), a horizontal end point (Xend), a vertical start point (Ystart), and a vertical end point (Yend) of the image for the image data acquirer 10.

In some embodiments, the image corrector 20 applies a reverse offset to an address for retrieving the image data from the memory 50 according to the cropping control information.

In some embodiments, the image corrector 20 obtains a position of input pixel Pin (xi, yi) corresponding to each output pixel Pdisp (xo, yo) for display, and calculates a corrected pixel value P' disp (xo, yo) according to a group of adjacent pixels at the horizontal and vertical positions of the input pixel Pin (xi, yi) by using an interpolation algorithm.

In some embodiments, the image corrector 20, which is Δ Ymax=max [fvmap (i, j)−j], where j is the row coordinate of the output pixel, i is a column coordinate of the output pixel, and fvmap (i, j) is a transformation function from the row coordinate of the output pixel to the row coordinate of the input pixel.

In some embodiments, the image corrector 20 generates an initial offset and sends it to the display follower 30. The calculation method for generating the initial offset includes the following processes. The offset can be calculated by offset=Δ Ymax+Padding+FramelockError, where Padding is the number of lines extending upward in a vertical direction of pixel interpolation calculation, and FramelockError is the maximum number of error lines of the input and output line synchronization signals of the display follower 30. The display follower 30 generates a display line-field synchronization signal according to an input line-field synchronization signal from the image data acquirer 10, the initial offset from the image corrector 20, and a configured frame rate ratio of the field synchronization, and sends the display line-field synchronization signal to the display driver 40.

In some embodiments, the field synchronization may be configured as a frame rate ratio of 1:1, 1:2, . . . , 1:N according to actual requirements, and typical values are 1:1 and 1:2.

In some embodiments, the display follower 30 generates the final offset of the line-field synchronization from the input pixel to the output pixel according to the input line-field synchronization signal from the image data acquirer 10, the initial offset of the image corrector 20, and the configured frame rate ratio of the field synchronization, generates the display line-field synchronization signal according to the input line-field synchronization signal generated by the image acquirer 10, and sends the display line-field synchronization signal to the display driver 40.

In some embodiments, the formula for calculating the offset of the line-field synchronization from the input pixel to the output pixel is as follows:

$$\text{Offset}'=(N-1)*VTOTAL+\text{Offset}*N$$

where N is the frame rate ratio of the field synchronization signal, VTOTAL is a total number of line synchronization signals in a frame, and Offset is the initial offset of the image corrector 20.

Figure 4:
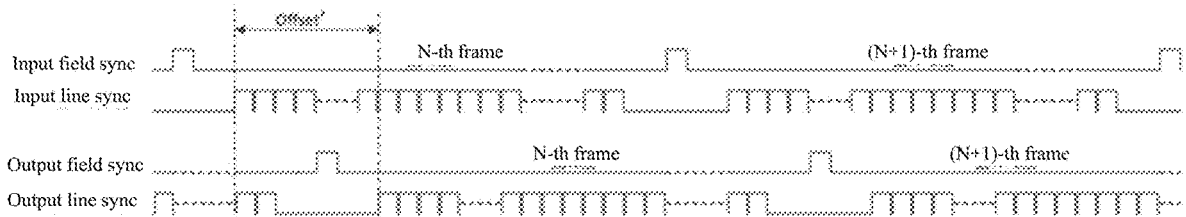
FIG. 4 is a schematic timing diagram of an input line-field synchronization signal and an output line-field synchronization signal according to some embodiments of the present disclosure.

FIG. 4 is a schematic timing diagram of an input line-field synchronization signal and an output line-field synchronization signal according to some embodiments of the present disclosure. As shown in FIG. 4, to achieve an objective of minimizing a latency from the image input of the camera to the display, it is necessary to ensure that the input pixel corresponding to each output pixel has been written into the system memory during the display. To achieve the above objective, the present disclosure provides the following technical measures.

A display following mode is used to lock a display time sequence with an input time sequence by the camera. As shown in FIG. 3, the display time sequence and the input time sequence by the camera are locked in a 1:1 ratio. Each rising edge of input/output field synchronization signals corresponds to a start of a new image frame, and each rising edge of the input/output line synchronization signals corresponds to a start of a new image line. The time consumed by inputting and outputting each frame/line in a locked state is equal, line to line (e.g., the first line of the input image and the first line of the output image) is equal, and is equal to the "initial offset".

The method for calculating the initial offset ensures that the input image required for calculating each output pixel before displaying is written into the system memory. The display latency is substantially reduced compared to conventional practices. The display driver 40 receives the corrected image data from the image corrector 20 and performs the image display according to the display line-field synchronization signal outputted from the display follower 30. The display driver 40 may include more image processing functions, such as color adjustment, sharpening, etc., in various image distortion correction systems.

In some embodiments, the image data acquirer 10 packs the cropped image data and stores the packed image data in the memory 50 through a system bus. The image corrector 20 reads the cropped image data from the memory 50 through the system bus.

Embodiment 2

Figure 2:
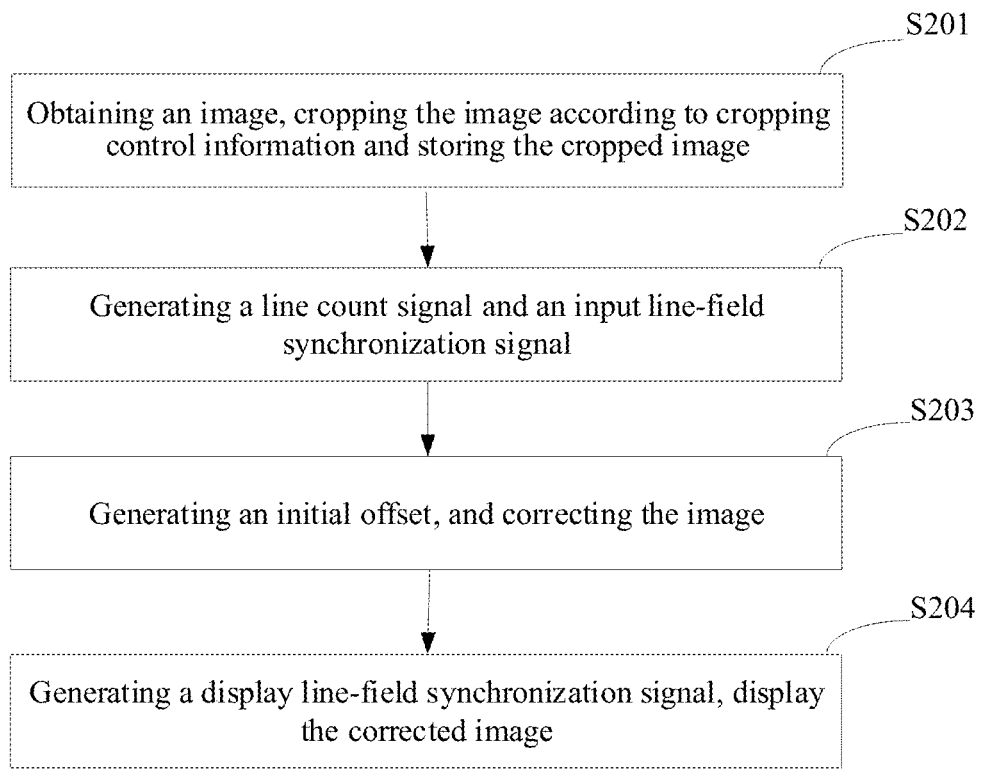
FIG. 2 is a flowchart of an exemplary image distortion correction method according to some embodiments of the present disclosure.

FIG. 2 is a flowchart of an exemplary image distortion correction method according to some embodiments of the present disclosure. The image distortion correction method is described in detail below with reference to FIG. 2.

At S201, obtaining an image, cropping the image according to cropping control information and storing the cropped image.

In some embodiments, the image corrector 20 calculates the effective input image area information required for display according to the requirement of image correction, and generates the cropping control information including the horizontal starting point (Xstart), the horizontal ending point (Xend), the vertical starting point (Ystart), and the vertical ending point (Yend) of the image, and sends the cropping control information to the image data acquirer 10.

At S202, generating a line count signal and an input line-field synchronization signal.

In some embodiments, the image data acquirer 10 receives the image data from the camera and crops the image of the image data according to the cropping control information inputted by the image corrector 20; packs the cropped image and stores the packed image in the memory 50; sends the generated input line-field synchronization signal to the display follower 30; and sends the generated line count signal to the image corrector 20.

At S203, generating an initial offset, and correcting the image.

In some embodiments, the image corrector 20 retrieves and corrects the cropped image data from the memory 50, and sends the corrected image data to the display driver 40.

In some embodiments, the image corrector 20 calculates a corrected pixel value P' disp (xo, yo) according to a group of adjacent pixels at the horizontal and vertical positions of the input pixel Pin (xi, yi) by using the interpolation algorithm. The initial offset is generated according to the following calculation method:

$$Offset=\Delta Ymax+Padding+FramelockError,$$

where Padding is the number of lines extending upwards in the vertical direction of the pixel interpolation calculation, FramelockError is the maximum number of error lines of the input and output line synchronization signals of the display follower 30, $\Delta Ymax$ is the maximum difference between the row coordinate of the output pixel and the mapped row coordinate of the input pixel, $\Delta Ymax=max[fvmap(i, j)-j]$, j is the row coordinate of the output pixel, i is the column coordinate of the output pixel, and fvmap (i, j) is the transformation function from the row coordinate of the output pixel to the row coordinate of the input pixel.

In some embodiments, the image corrector 20 starts or suspends the correction of the cropped image data according to the line count signal from the image data acquirer 10. When the line number of the retrieved image data exceeds the count value of the line count signal, the correction is suspended. Otherwise, the correction is started.

In some embodiments, the image corrector 20 applies the reverse offset to the address for retrieving the image data from the memory 50 according to the cropping control information.

At S204, generating a display line-field synchronization signal, display the corrected image In some embodiments, the display driver 40 receives the corrected image data from the image corrector 20, and displays the corrected image display according to the display line-field synchronization signal outputted by the display follower 30.

In some embodiments, the display follower 30 generates the offset of the line-field synchronization from the input to the output and the display line-field synchronization signal according to an input line-field synchronization signal outputted from the image data acquirer 10, the initial offset outputted from the image corrector 20, and the configured frame rate ratio of field synchronization, and sends the display line-field synchronization signal to the display driver

40. The offset of the line-field synchronization from the input to the output can be calculated by the following formula:

$$Offset'=(N-1)*VTOTAL+Offset*N,$$

where Offset' is the offset of the line-field synchronization from the input to the output, N is the frame rate ratio of the field synchronization signal, VTOTAL is the total number of line synchronization signals in an image frame, and Offset is the initial offset of the image corrector 20.

In some embodiments, the field synchronization may be configured as a frame rate ratio of 1:1, 1:2, . . . , 1:N according to actual requirements, and typical values are 1:1 and 1:2.

In the embodiments of the present disclosure, the system and the method of image distortion correction adopt the camera input and the display output line-field synchronization structure with self-adaptive image correction requirement, the camera input and the display output line-field synchronization algorithm with the self-adaptive image correction requirement, and the memory management scheme with the self-adaptive image correction requirement. Thus, the latency from the camera input to the display output introduced by digital signal processing is reduced to the maximum extent, the reaction time reserved for the driver is increased, the safety of driving a vehicle is improved, the use of the system memory is reduced, and the cost of the entire system is reduced.

It should also be understood that references to "one embodiment" or "some embodiments" etc. in the specification means that one or more embodiments of the present disclosure include a specific feature, structure, or characteristic described in combination with the embodiment. Therefore, the sentences starting with "in one embodiment", "in some embodiments", "in another embodiment", "in some other embodiments", etc. appearing in different places in the specification are not necessarily referring to a same embodiment, but are referring to "one or more but not all embodiments" unless it is specifically emphasized otherwise. The terms "including", "including", "having" and their variations all refer to "including but not limited to", unless otherwise specifically emphasized.

Those of ordinary skill in the art may realize that the units and algorithm steps of the examples described in combination with the embodiments disclosed herein can be implemented by electronic hardware or a combination of computer software and electronic hardware. Whether these functions are executed by hardware or software depends on the specific application and design constraint conditions of the technical solution. Professionals and technicians can use different methods for each specific application to implement the described functions, but such implementation should not be considered beyond the scope of the present disclosure.

The above-mentioned embodiments are only used to illustrate the technical solutions of the present disclosure, not to limit them. Although the present disclosure has been described in detail with reference to the foregoing embodiments, those of ordinary skill in the art should understand that the foregoing technical solutions described in the embodiments can be modified, or some of the technical features can be equivalently replaced. These modifications or replacements do not cause the essence of the corresponding technical solutions to deviate from the spirit and scope of the technical solutions of the embodiments of the present disclosure, and should be included in the scope of the present disclosure.

What is claimed is:

1. An image distortion correction system, comprising:

an image data acquirer configured to receive image data from a camera, crop an image of the image data according to cropping control information generated by an image corrector, and stores the image data of the cropped image into a memory;

the image corrector configured to retrieve the image data of the cropped image from the memory, correct the cropped image, send the image data of the corrected image to a display driver for display, calculate a corrected pixel value according to a group of adjacent pixels at horizontal and vertical positions of an input pixel by using an interpolation algorithm, statistically count a maximum difference between a row coordinate of an output pixel and a mapped row coordinate of the input pixel, according to the statistically counted maximum difference between the row coordinate of the output pixel and the mapped row coordinate of the input pixel, a number of lines extending upward in a vertical direction of pixel interpolation calculation, and a maximum number of error lines of input and output line synchronization signals, generate an initial offset, and send the initial offset to a display follower;

the display follower configured to generate a display line-field synchronization signal and send the display line-field synchronization signal to the display driver;

the display driver; and the memory.

2. The image distortion correction system according to claim 1, wherein:

the image corrector calculates an effective input image area information required for display according to a requirement of image correction, and generates the cropping control information including a horizontal start point, a horizontal end point, a vertical start point, and a vertical end point of the image.

3. The image distortion correction system according to claim 1, wherein:

the image corrector starts or suspends correction of the cropped image according to a line count signal from the image data acquirer;

in response to a line number of the retrieved image data exceeding a count value of the line count signal, the correction is suspended; and in response to the line number of the retrieved image data not exceeding the count value of the line count signal, the correction is started.

4. The image distortion correction system according to claim 1, wherein:

a formula for statistically counting the maximum difference between the row coordinate of the output pixel and the mapped row coordinate of the input pixel is $\Delta Ymax=max \ [fvmap \ (i, \ j)-j]$, wherein j is the row coordinate of the output pixel, i is a column coordinate of the output pixel, and fvmap (i, j) is a transformation function from the row coordinate of the output pixel to the row coordinate of the input pixel.

5. The image distortion correction system according to claim 4, wherein:

a formula for generating the initial offset is $Offset=\Delta Ymax+Padding+FramelockError$, wherein Offset is the initial offset, $\Delta Ymax$ is the maximum difference between the row coordinate of the output pixel and the mapped row coordinate of the input pixel, Padding is the number of lines extending upwards in the vertical direction of the pixel interpolation calculation, and FramelockError is the maximum number of error lines of the input and output line synchronization signals of the display follower.

6. The image distortion correction system according to claim 1, wherein:

the image corrector applies a reverse offset to an address for retrieving the image data from the memory according to the cropping control information.

7. The image distortion correction system according to claim 1, wherein:

the display follower generates an offset of line-field synchronization from the input to the output and the display line-field synchronization signal according to an input line-field synchronization signal outputted from the image data acquirer, an initial offset outputted from the image corrector, and a configured frame rate ratio of field synchronization, and sends the display line-field synchronization signal to the display driver; and the offset of the line-field synchronization from the input to the output is calculated by $Offset'=(N-1)*VTOTAL+Offset*N$, where Offset' is the offset of the line-field synchronization from the input to the output, N is a frame rate ratio of a field synchronization signal, VTOTAL is a total number of line synchronization signals in an image frame, and Offset is the initial offset of the image corrector.

8. An image distortion correction method, comprising:

obtaining an image, cropping the image according to cropping control information, and storing the cropped image;

generating a line count signal and an input line-field synchronization signal;

generating an initial offset, and correcting the cropped image;

generating a display line-field synchronization signal according to the input line-field synchronization signal, the initial offset, and a configured frame rate ratio of field synchronization, and displaying the corrected image according to the display line-field synchronization signal;

calculating a corrected pixel value according to a group of adjacent pixels at horizontal and vertical positions of an input pixel by using an interpolation algorithm;

statistically counting a maximum difference between a row coordinate of an output pixel and a mapped row coordinate of the input pixel; and according to the statistically counted maximum difference between the row coordinate of the output pixel and the mapped row coordinate of the input pixel, a number of lines extending upward in a vertical direction of pixel interpolation calculation, and a maximum number of error lines of input and output line synchronization signals, generating and sending an initial offset.

9. The image distortion correction method according to claim 8, wherein:

the cropping control information includes a horizontal start point, a horizontal end point, a vertical start point, and a vertical end point of an effective input image area information required for display according to a requirement of image correction.

10. The image distortion correction method according to claim 8, further comprising:

starting or suspending correction of the cropped image according to the line count signal;

in response to a line number of retrieved image data of the cropped image exceeding a count value of the line count signal, suspending the correction of the cropped image; and in response to the line number of retrieved image data of the cropped image not exceeding the count value of the line count signal, starting the correction of the cropped image.

11. The image distortion correction method according to claim 8, wherein:

a formula for statistically counting the maximum difference between the row coordinate of the output pixel and the mapped row coordinate of the input pixel is $\Delta Ymax=max [fvmap (i, j)-j]$, wherein j is the row coordinate of the output pixel, i is a column coordinate of the output pixel, and fvmap (i, j) is a transformation function from the row coordinate of the output pixel to the row coordinate of the input pixel.

12. The image distortion correction method according to claim 11, wherein:

a formula for generating the initial offset is Offset=$\Delta Ymax$+Padding+FramelockError, wherein Offset is the initial offset, $\Delta Ymax$ is the maximum difference between the row coordinate of the output pixel and the mapped row coordinate of the input pixel, Padding is the number of lines extending upwards in the vertical direction of the pixel interpolation calculation, and FramelockError is the maximum number of error lines of the input and output line synchronization signals.

13. The image distortion correction method according to claim 8, further comprising:

applying a reverse offset to an address for retrieving the image data according to the cropping control information.

14. The image distortion correction method according to claim 8, wherein:

an offset of line-field synchronization from an input to an output is calculated by Offset'=(N−1)*VTOTAL+Offset*N, where Offset' is the offset of the line-field synchronization from the input to the output, N is a frame rate ratio of a field synchronization signal, VTOTAL is a total number of line synchronization signals in an image frame, and Offset is the initial offset of the image corrector.

* * * * *